*(12)* United States Patent
A et al.

*(10)* Patent No.: US 12,367,074 B1
*(45)* Date of Patent: Jul. 22, 2025

*(54)* NETWORK MANAGEMENT SOFTWARE-AS-A-SERVICE SYSTEM FOR ALLOCATING RESOURCES (ALSO TERMED THREADS) OF CONTAINERS FOR PERFORMANCE OF A JOB

*(71)* Applicant: Juniper Networks, Inc., Sunnyvale, CA (US)

*(72)* Inventors: Chandrasekhar A, Bengaluru (IN); Jayanthi R, Bangalore (IN)

*(73)* Assignee: Juniper Networks, Inc., Sunnyvale, CA (US)

( * ) Notice: Subject to any disclaimer, the term of this patent is extended or adjusted under 35 U.S.C. 154(b) by 770 days.

*(21)* Appl. No.: 17/556,130

*(22)* Filed: Dec. 20, 2021

*(51)* Int. Cl.
*G06F 9/50* (2006.01)
*(52)* U.S. Cl.
CPC .................. *G06F 9/5038* (2013.01)
*(58)* Field of Classification Search
CPC .................................................... G06F 9/5038
See application file for complete search history.

*(56)* References Cited

U.S. PATENT DOCUMENTS

2010/0186020 A1\* 7/2010 Maddhirala ........... G06F 9/5072
718/105

OTHER PUBLICATIONS

Eddy Truyen, et al.; "Towards a Container-based Architecture for Multi-Tenant SaaS applications"; Dec. 12-16, 2016; ARM 2016; 7 pages; 2016ACM; https://www.researchgate.net/publication/311622895_Towards_a_container-based_architecture_for_multi-tenant_SaaS_applications.
Yu Wang, et al.; Container-Based Performance Isolation for MultiTenant SaaS Applications in Micro-Service Architecture; Journal of Physics: Conference Series; vol. 1486 (2020) 052032; ISCME 2019; 10 pages; IOP Publishing; https://iopscience.iop.org/article/10.1088/1742-6596/1486/5/052032/pdf.

\* cited by examiner

*Primary Examiner* — Wissam Rashid
*(74) Attorney, Agent, or Firm* — Harrity & Harrity, LLP

*(57)* ABSTRACT

A resource controller module of a network management system receives a request for an allocation of threads to perform a job associated with a job category for a tenant associated with the network management system. The resource controller module determines, based on the request, a number of available threads associated with the job category of the system at a particular time and causes, based on the request and the number of available threads associated with the job category at the particular time, a group of threads associated with the job category to be allocated to perform the job to be allocated to perform the job.

20 Claims, 13 Drawing Sheets

NETWORK MANAGEMENT SOFTWARE-AS-A-SERVICE SYSTEM FOR ALLOCATING RESOURCES (ALSO TERMED THREADS) OF CONTAINERS FOR PERFORMANCE OF A JOB

BACKGROUND

Software-as-a-service (SaaS) is a cloud service that hosts applications or services. In some cases, a multi-tenant SaaS environment may provide resources that are to be shared by different tenants (e.g., different groups of subscribers or customers) of the environment.

SUMMARY

Some implementations described herein relate to a system. The system may include one or more memories and one or more processors. The system may be configured to identify a plurality of containers of the system. The system may be configured to receive a first request for an allocation of threads to perform a job associated with a job category for a tenant associated with the system. The system may be configured to determine, based on the first request, a number of available threads associated with the job category of the system at a first time. The system may be configured to cause, based on the first request and the number of available threads associated with the job category at the first time, a first group of threads associated with the job category to be allocated to perform the job. The system may be configured to receive, based on causing the a first group of threads associated with the job category to be allocated to perform the job, a second request for an allocation of threads associated with the job category to perform at least one task of the job. The system may be configured to determine, based on the second request, a number of available threads associated with the job category of the system at a second time. The system may be configured to cause, based on the second request and after determining the number of available threads associated with the job category at the second time, a second group of threads associated with the job category to be allocated to perform the at least one task.

Some implementations described herein relate to a non-transitory computer-readable medium that stores a set of instructions for a system. The set of instructions, when executed by one or more processors of the system, may cause the system to identify a job to be performed for a tenant associated with the system, wherein a job category associated with the job indicates that the job is a bulk operation job that includes one or more tasks to be performed for each endpoint device of a plurality of endpoint devices of the tenant. The set of instructions, when executed by one or more processors of the system, may cause the system to send, based on identifying the job, a request for a total number of threads associated with the job category allocated to perform the job at a particular time. The set of instructions, when executed by one or more processors of the system, may cause the system to receive, based on the request, information indicating a total number of threads associated with the job category allocated to perform the job at the particular time. The set of instructions, when executed by one or more processors of the system, may cause the system to calculate, based on the information and identifying the job, an amount of time to complete performance of the job at the particular time. The set of instructions, when executed by one or more processors of the system, may cause the system to provide the amount of time to complete performance of the job at the particular time.

Some implementations described herein relate to a method. The method may include receiving, by a module of a system, a request for an allocation of threads to perform a job associated with a job category for a tenant associated with the system. The method may include determining, by the module of the system and based on the request, a number of available threads associated with the job category of the system at a particular time. The method may include causing, by the module of the system and based on the request and the number of available threads associated with the job category at the particular time, a group of threads associated with the job category to be allocated to perform the job.

DETAILED DESCRIPTION

Figure 1A:
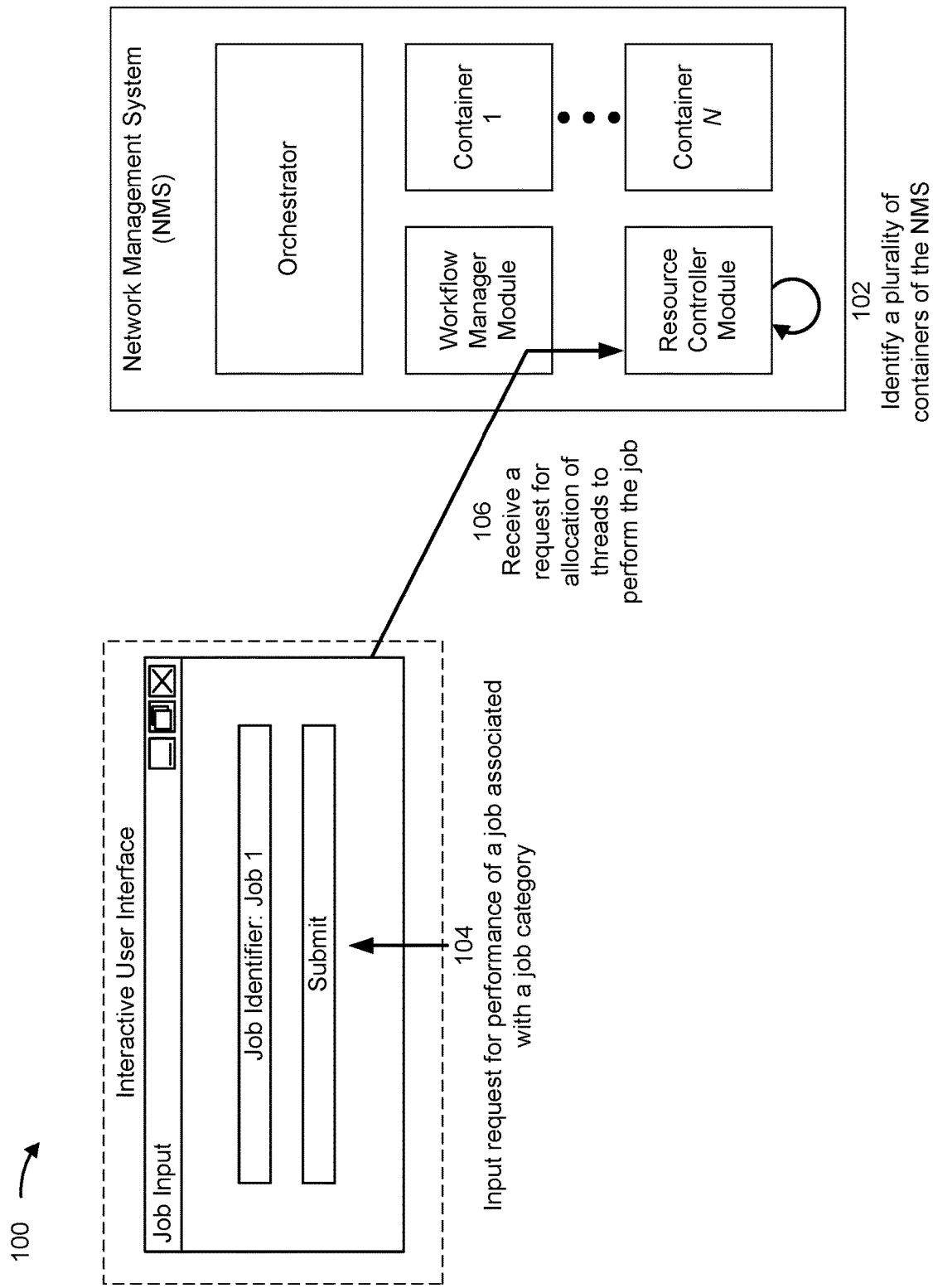
FIGS. 1A-1H are diagrams of an example implementation described herein.

The following detailed description of example implementations refers to the accompanying drawings. The same reference numbers in different drawings may identify the same or similar elements.

In a multi-tenant software-as-a-service (SaaS) environment, a central control system controls access by tenants to resources of the central control system. In a first typical configuration, the central control system reserves respective sets of resources for each tenant of the central control system. However, this often causes resources to not be used, even though an overall demand on the central control system is high (e.g., a number of high-need tenants request resources for jobs, but resources assigned to low-need tenants cannot be allocated to the high-need tenants). This results in an inefficient use of the resources and delays in performing the jobs for high-need tenants. In a second typical configuration, the central control system allocates resources to perform jobs as requests for resources are received from tenants of the central control system. This often enables a number of tenants to monopolize resources of the central control system, which can cause unacceptable delays in performance of jobs for other tenants of the central control system.

Some implementations described herein provide a network management system (NMS). The NMS includes a resource controller module and a workflow manager module for monitoring and allocating a plurality of containers of the NMS. Each container includes one or more threads. A thread includes at least one resource, such as a processing resource, a memory resource, and/or another resource, of the NMS. In some implementations, each container may include a plurality of sets of threads, wherein each set of threads (e.g., that includes one or more threads) is associated with a job category (e.g., the one or more threads of the set are configured to be utilized for jobs associated with the job category). For example, a container may include a respective set of threads associated with a configuration deployment job category, a script deployment job category, an image deployment job category, a bulk operation job category, and/or another job category. The NMS provides a multi-tenant SaaS environment. Accordingly, a plurality of endpoint devices (e.g., user devices, client devices, server devices, Internet of things (IoT) devices, and/or other devices) are associated with a tenant of the NMS, and a network device (e.g., a router or a gateway) associated with the tenant connects the plurality of endpoint devices to the NMS (e.g., via a network).

In some implementations, the NMS provides an interactive user interface that allows a user to input a request for performance of a job (e.g., that is associated with a job category). Accordingly, the resource controller module of the NMS receives a request for allocation of threads associated with the job category to perform the job. The resource controller module determines a number of available threads associated with the job category of the NMS (e.g., a number of threads associated with the job category not allocated for other jobs associated with the job category) at a first time and causes a group of threads associated with the job category to be allocated to perform the job based on the number of available threads associated with the job category at the first time.

In some implementations, while the job is being performed, the workflow manager module sends a request to the resource controller module for allocation of (additional) threads associated with the job category to perform at least one task of the job (e.g., when the job includes multiple tasks). The resource controller module determines a number of available threads associated with the job category of the NMS (e.g., a number of threads associated with the job category not allocated for other jobs associated with the job category) at a second time and causes an additional group of threads associated with the job category to be allocated to perform the at least one task based on the number of available threads associated with the job category at the second time.

In some implementations, the resource controller module determines that the NMS needs additional containers to ensure allocation of a sufficient number of threads to perform a job or task. Accordingly, the resource controller module causes additional containers to be created for the NMS.

In some implementations, the workflow manager module determines that a job category of a job indicates that the job is a bulk operation job (e.g., that includes one or more tasks to be performed for each endpoint device of the plurality of endpoint devices of the tenant). Accordingly, the workflow manager module communicates with the resource controller module to determine a total number of threads associated with the job category allocated to perform the job and calculates an amount of time to complete performance of the job (e.g., a total amount of time to perform the one or more tasks for each of the plurality of endpoint devices). This information is provided (e.g., to the interactive user interface) to allow the information to be displayed to a user (e.g., an administrator of the NMS and/or the plurality of endpoint devices) to inform the user of how much time is needed to complete the job.

In this way, the NMS enables resources (e.g., threads of the NMS) to be shared by multiple tenants and allows the resources to be fairly allocated based on real-time needs of individual tenants (e.g., and real-time availability of resources of the NMS). This promotes efficient use of the resources of the NMS. For example, a likelihood that a particular tenant hogs resources of the NMS such that other tenants cannot use the resources is decreased. As another example, the NMS does not reserve a minimum amount of resources for each tenant, which increases a likelihood that resources of the NMS are used when needed by one or more high-need tenants and not unnecessarily reserved for low-need tenants.

FIGS. 1A-1H are diagrams of one or more example implementations 100 described herein. Example implementation(s) 100 may include a network management system (NMS), a network device, and/or one or more endpoint devices, which are described in more detail below in connection with FIGS. 2-4. The NMS may be, for example, a multi-tenant cloud hosted network management SaaS system and the one or more endpoint devices and the network device may be associated with a tenant of a multi-tenant SaaS environment provided by the NMS. As shown in FIGS. 1A-1H, the NMS may include an orchestrator, a workflow manager module, a resource controller module, and a plurality of containers (shown as containers 1 through N, where N≥2, in FIG. 1A). Each container may include one or more threads, where a thread comprises at least one resource, such as a processing resource, a memory resource, and/or another resource, of the NMS.

The orchestrator of the NMS may be configured to create containers (e.g., add new containers to the plurality of containers) and/or to delete containers (e.g., remove containers from the plurality of containers). For example, based on communicating with the workflow manager module of the NMS and/or resource controller module of the NMS, the orchestrator may create or delete containers. The workflow manager module may be configured to schedule and allocate threads for performance of jobs (and/or tasks of the jobs when the jobs comprise multiple tasks). The resource controller module may be configured to track a number of overall containers of the NMS, a number of overall threads of the NMS (e.g., per job category), a number of allocated threads of the NMS (e.g., per job category), a number of allocated threads of the NMS (e.g., per job category), and/or other information associated with the plurality of containers of the NMS. In some implementations, the resource controller module may be configured to cause allocation of threads of containers, of the plurality of containers, for jobs (e.g., by communicating with the workflow manager module), to cause creation of containers (e.g., by communicating with the workflow manager module and/or the orchestrator), and/or to cause other operations associated with the plurality of containers.

As shown in FIG. 1A, and by reference number 102, the resource controller module may identify a plurality of containers of the NMS. For example, the resource controller module may identify the plurality of containers 1 through N shown in FIG. 1A. In some implementations, each of the plurality of containers includes a same number of threads (e.g., associated with a job category). In some implementations, each container may include a plurality of sets of threads, wherein each set of threads (e.g., that includes one or more threads) is associated with a job category (e.g., the one or more threads of the set are configured to be utilized for jobs associated with the job category). For example, a container may include a respective set of threads associated with a configuration deployment job category, a script deployment job category, an image deployment job category, a bulk operation job category, and/or another job category.

As further shown in FIG. 1A, the NMS may provide an interactive user interface for display. For example, the NMS may provide the interactive user interface to a device (e.g., an endpoint device, of the one or more endpoint devices, or another device, such as a client device associated with the NMS) to cause the interactive user interface to be displayed on a display of the device. The interactive user interface may include an input functionality that allows a user (e.g., of the device) to input information. For example, as shown by reference number 104, the interactive user interface may include a "job input" prompt that allows a user to input a request for performance of a job (e.g., that is associated with a job category). The job may include, for example, a configuration deployment job, a script deployment job, an image deployment job, or another type of job (e.g., for at least one of the one or more endpoint devices). The job may include one or more tasks (e.g., logically structured as a tree of tasks or as direct acyclic graph (DAG) of tasks). In some implementations, the job may be a bulk operation job (e.g., that includes one or more tasks to be performed by each endpoint device of a set of the plurality of endpoint devices of the tenant).

As shown by reference number 106, the resource controller module may receive a request for an allocation of threads to perform the job. For example, the NMS may receive the request for performance of the job via the interactive user interface, and may generate and provide (e.g., as part of providing the interactive user interface and/or by using the workflow manager module and/or the resource controller module) the request for the allocation of threads to perform the job to the resource controller module. The request for the allocation of threads to perform the job may include information indicating an identifier associated with the tenant (e.g., a string that identifies the tenant), a job category of the job (e.g., which may indicate whether the job is a bulk operation job), a weight associated with the job (e.g., a number value indicating an importance of the job, such as high importance job, a medium importance job, or a low importance job), a minimum number of threads associated with the job category to perform the job, and/or a maximum number of threads associated with the job category to perform the job.

Figure 1B:
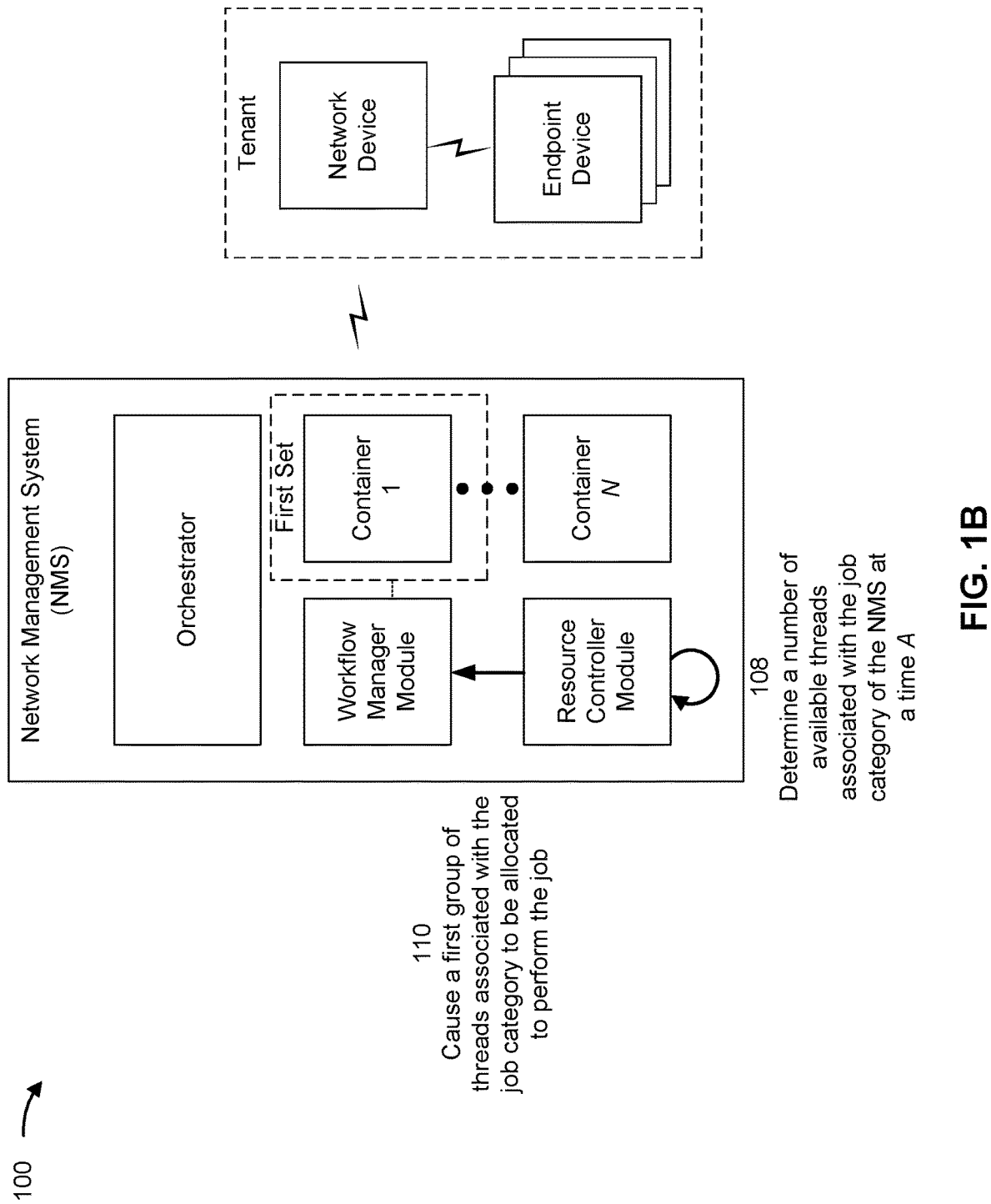

As shown in FIG. 1B, and by reference number 108, the resource controller module may determine (e.g., based on the request for the allocation of threads to perform the job received by the resource controller module) a number of available threads associated with the job category of the NMS at a time A. For example, the resource controller module may determine, based on the request for the allocation of threads to perform the job, a number of the plurality of containers of the NMS at the time A, and may determine, based on determining the number of the plurality of containers at the time A, a number of overall threads associated with the job category of the NMS at the time A (e.g., by multiplying the number of the plurality of containers by the number of threads associated with the job category in each container of the plurality of containers). In some implementations, the, resource controller module may communicate with a data structure (e.g., a database, an electronic folder, and/or an electronic file of the NMS or accessible to the NMS) to determine a number of allocated threads associated with the job category of the NMS at the time A (e.g., a number of threads associated with the job category that are allocated for other jobs associated with the job category at the time A), and may determine, based on the number of overall threads associated with the job category of the NMS at the time A and the number of allocated threads associated with the job category of the NMS at the time A, the number of available threads associated with the job category of the NMS at the time A. For example, the resource controller module may determine a difference between the number of overall threads associated with the job category of the NMS at the time A and the number of allocated threads associated with the job category of the NMS at the time A to determine the number of available threads associated with the job category of the NMS at the time A. In some implementations, the resource controller module may retain a buffer of threads associated with the job category (e.g., a reserve of threads associated with the job category to remain unallocated for potential future jobs associated with the job category), which may be a particular percentage of the overall threads associated with the job category. Accordingly, the resource controller module may determine a difference between the number of overall threads associated with the job category of the NMS at the time A, less a number of the buffer of threads associated with the job category and the number of allocated threads associated with the job category of the NMS at the time A, to determine the number of available threads associated with the job category of the NMS at the time A.

As shown by reference number 110, the resource controller module may cause a first group of threads associated with the job category to be allocated to perform the job (e.g., based on the request for the allocation of threads to perform the job and the number of available threads associated with the job category at the time A). For example, the resource controller module may process the request for the allocation of threads to perform the job to determine a minimum number of threads associated with the job category to perform the job and/or a maximum number of threads associated with the job category to perform the job. The resource controller module may determine that at least one of: the minimum number of threads associated with the job category to perform the job, and/or the maximum number of threads associated with the job category to perform the job, is less than the number of available threads associated with the job category of the NMS at the time A and, accordingly, may cause a particular group of threads associated with the job category (e.g., shown as being part of a first set of containers that includes at least container 1 of the plurality of containers in FIG. 1B) to be allocated to perform the job (e.g., as the first group of threads associated with the job category). The particular group of threads associated with the job category may include a total number of threads associated with the job category that is greater than or equal to the minimum number of threads associated with the job category to perform the job and less than or equal to the maximum number of threads associated with the job category to perform the job.

Figure 1C:
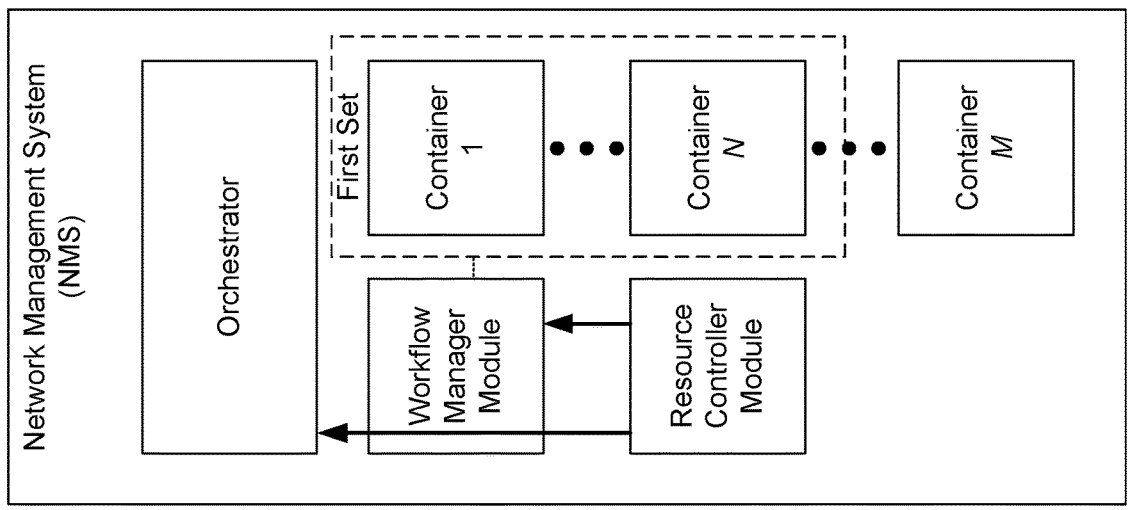

In some implementations, the resource controller module may determine that the minimum number of threads associated with the job category to perform the job is greater than or equal to the number of available threads associated with the job category of the system at the time A. Accordingly, as shown in FIG. 1C and by reference number 112, the resource controller module may cause additional containers (e.g., one or more containers between container N and container M in FIG. 1C) to be created and to be added to the plurality of containers of the NMS. For example, the resource controller module may send a message to the orchestrator (e.g., via the workflow manager module) to cause the orchestrator to create the additional containers. As shown by reference number 114, the resource controller module may cause (e.g., based on causing the additional containers to be created and to be added to the plurality of containers of the NMS) a first group of threads associated with the job category to be allocated to perform the job (e.g., shown as being part of the first set of containers that includes at least containers 1 through N). The first group of threads associated with the job category may include a total number of threads associated with the job category that is greater than or equal to the minimum number of threads associated with the job category to perform the job.

In some implementations, the resource controller module, based on causing the first group of threads associated with the job category to be allocated to perform the job, may update the data structure to indicate that the first group of threads associated with the job category are allocated (e.g., to perform the job). Accordingly, after completion of the job, or as particular threads associated with the job category complete tasks of the job, the resource controller module may determine that the first group of threads associated with the job category, or the particular threads associated with the job category, are no longer allocated, and may update the data structure to indicate that the first group of threads associated with the job category, or the particular threads associated with the job category, are no longer allocated.

Figure 1D:
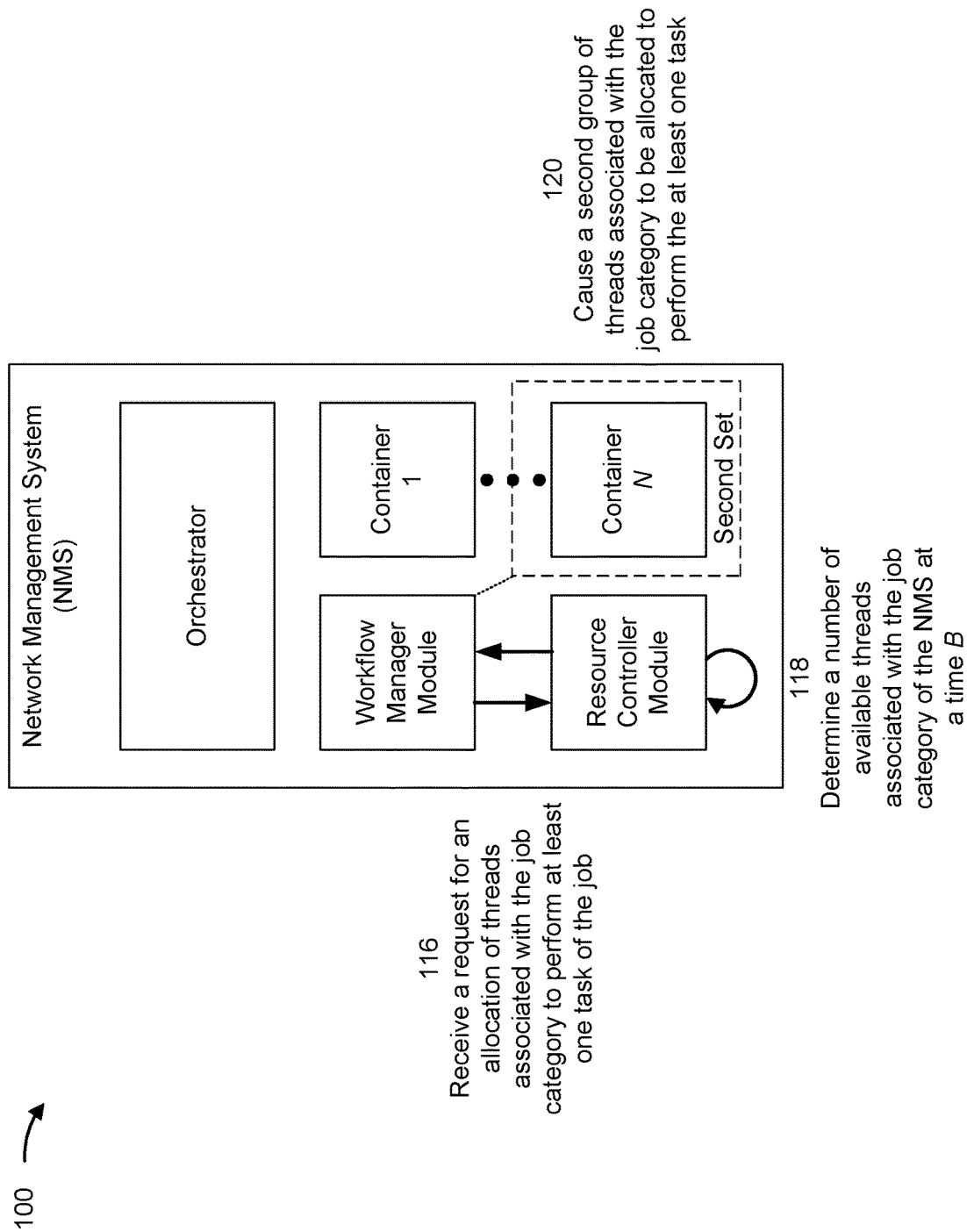

As shown in FIG. 1D, and by reference number 116, the resource controller module may receive a request for an allocation of threads associated with the job category to perform at least one task of the job. For example, the workflow manager module may send (e.g., while the job is being performed) the request for an allocation of threads associated with the job category to perform the at least one task of the job to the resource controller module (e.g., to assist in performance of the at least one task). The request may include information indicating an identifier associated with the tenant, a type of the at least one task of the job, a weight associated with the at least one task of the job, a minimum number of threads associated with the job category to perform the at least one task of the job, and/or a maximum number of threads associated with the job category to perform the at least one task of the job.

As shown by reference number 118, the resource controller module may determine (e.g., based on the request for the allocation of threads associated with the job category to perform the at least one task of the job received by the resource controller module) a number of available threads associated with the job category of the NMS at a time B. For example, the resource controller module may determine, based on the request for the allocation of threads associated with the job category to perform the at least one task of the job, a number of the plurality of containers of the NMS at the time B, and may determine, based on determining the number of the plurality of containers at the time B, a number of overall threads associated with the job category of the NMS at the time B (e.g., by multiplying the number of the plurality of containers by the number of threads associated with the job category in each container of the plurality of containers). In some implementations, the resource controller module may communicate with the data structure to determine a number of allocated threads associated with the job category of the NMS at time B (e.g., a number of threads associated with the job category that are allocated for other jobs associated with the job category at the time B), and may determine, based on the number of overall threads associated with the job category of the NMS at the time B and the number of allocated threads associated with the job category of the NMS at the time B, the number of available threads associated with the job category of the NMS at the time B. For example, the resource controller module may determine a difference between the number of overall threads associated with the job category of the NMS at the time B and the number of allocated threads associated with the job category of the NMS at the time B to determine the number of available threads associated with the job category of the NMS at the time B. In some implementations, the resource controller module may retain a buffer of threads associated with the job category (e.g., a reserve of threads associated with the job category to remain unallocated for potential future jobs associated with the job category), which may be a particular percentage of the overall threads associated with the job category. Accordingly, the resource controller module may determine a difference between the number of overall threads associated with the job category of the NMS at the time B, less a number of the buffer of threads associated with the job category and the number of allocated threads associated with the job category of the NMS at the time B, to determine the number of available threads associated with the job category of the NMS at the time B.

As shown by reference number 120, the resource controller module may cause a second group of threads associated with the job category to be allocated to perform the at least one task of the job (e.g., based on the request for the allocation of threads associated with the job category to perform the at least one task of the job and the number of available threads associated with the job category at the time B). For example, the resource controller module may process the request for the allocation of threads associated with the job category to perform the at least one task of the job to determine a minimum number of threads associated with the job category to perform the at least one task of the job and/or a maximum number of threads associated with the job category to perform the at least one task of the job. The resource controller module may determine that at least one of the minimum number of threads associated with the job category to perform the at least one task of the job and/or that the maximum number of threads associated with the job category to perform the at least one task of the job is less than the number of available threads associated with the job category of the NMS at the time B and, accordingly, may cause a particular group of threads associated with the job category (e.g., shown as being part of a second set of containers that includes at least container N of the plurality of containers in FIG. 1D), to be allocated to perform the at least one task of the job (e.g., as the second group of threads associated with the job category). The particular group of threads associated with the job category may include a total number of threads associated with the job category that is greater than or equal to the minimum number of threads associated with the job category to perform the at least one task of the job and less than or equal to the maximum number of threads associated with the job category to perform the at least one task of the job.

Figure 1E:
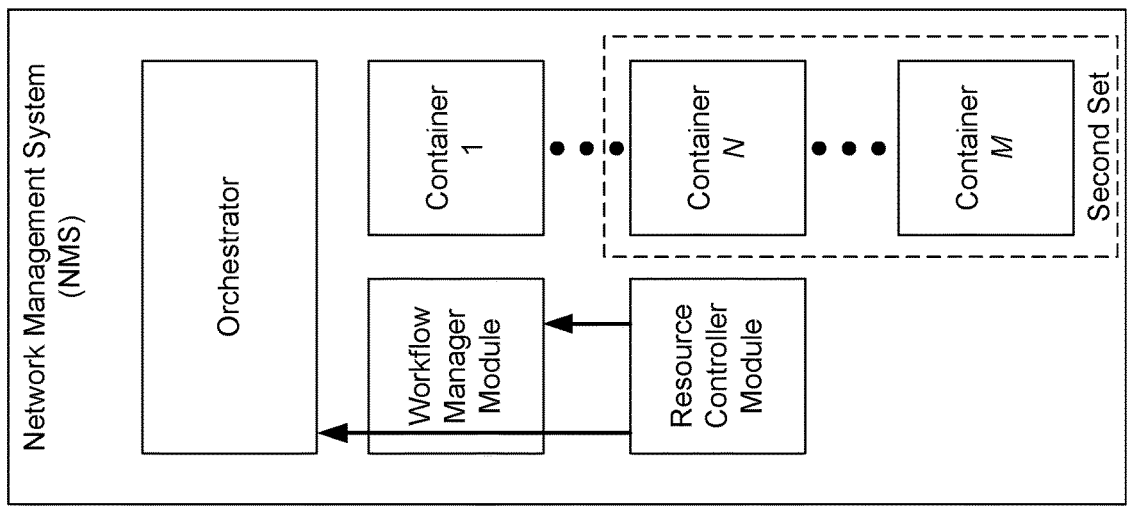

In some implementations, the resource controller module may determine that the minimum number of threads associated with the job category to perform the at least one task of the job is greater than or equal to the number of available threads associated with the job category of the system at the time B. Accordingly, as shown in FIG. 1E and by reference number 122, the resource controller module may cause additional containers (e.g., one or more containers between container N and container M in FIG. 1E) to be created and to be added to the plurality of containers of the NMS. For example, the resource controller module may send a message to the orchestrator (e.g., via the workflow manager module) to cause the orchestrator to create the additional containers. As shown by reference number 124, the resource controller module may cause (e.g., based on causing the additional containers to be created and to be added to the plurality of containers of the NMS) a second group of threads associated with the job category to be allocated to perform the at least one task of the job (e.g., shown as being part of the second set of containers that includes at least containers N through M). The second group of threads associated with the job category may include a total number of threads associated with the job category that is greater than or equal to the minimum number of threads associated with the job category to perform the at least one task of the job.

In some implementations, the resource controller module, based on causing the second group of threads associated with the job category to be allocated to perform the at least one task of the job, may update the data structure to indicate that the second group of threads associated with the job category are allocated (e.g., to perform the at least one task of the job). Accordingly, after completion of the at least one task of the job, or as particular threads associated with the job category complete tasks of the at least one task of the job, the resource controller module may determine that the second group of threads associated with the job category, or the particular threads associated with the job category, are no longer allocated and may update the data structure to indicate that the second group of threads associated with the job category, or the particular threads associated with the job category, are no longer allocated.

Figure 1F:
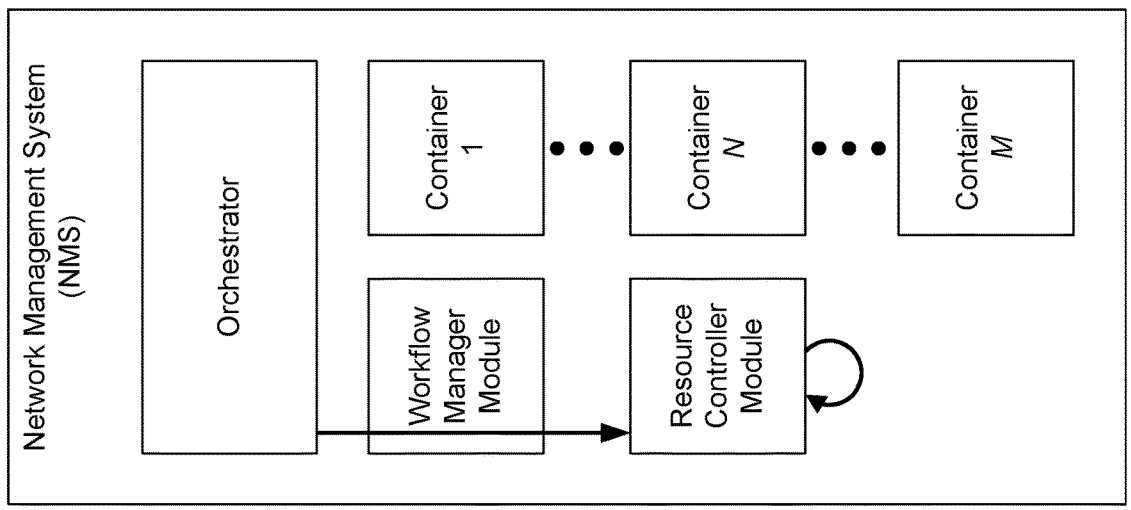

As shown in FIG. 1F, and by reference number 126, the resource controller module may receive a message indicating a container creation event or a container deletion event. For example, the orchestrator of the NMS may add containers to or remove containers from the plurality of containers and may send a message to the resource controller module (e.g., via the workflow manager module). Accordingly, as shown by reference number 128, the resource controller module may determine a number of available threads associated with the job category of the system at a time C. For example, the resource controller module may determine, based on the message, a number of the plurality of containers at the time C. The resource controller module may determine, based on determining the number of the plurality of containers at the time C, a number of overall threads associated with the job category of the system at the time C (e.g., by multiplying the number of the plurality of containers by the number of threads associated with the job category in each container of the plurality of containers). In some implementations, the resource controller module may communicate with the data structure to determine a number of allocated threads associated with the job category of the NMS at the time C (e.g., a number of threads associated with the job category allocated for other jobs associated with the job category at the time C), and may determine, based on the number of overall threads associated with the job category of the system at the time C and the number of allocated threads associated with the job category of the NMS at the time C, a number of available threads associated with the job category of the system at the time C. For example, the resource controller module may determine a difference between the number of overall threads associated with the job category of the NMS at the time C and the number of allocated threads associated with the job category of the NMS at the time C to determine the number of available threads associated with the job category of the NMS at the time C. In some implementations, the resource controller module may retain a buffer of threads associated with the job category (e.g., a reserve of threads associated with the job category to remain unallocated for potential future jobs), which may be a particular percentage of the overall threads associated with the job category. Accordingly, the resource controller module may determine a difference between the number of overall threads associated with the job category of the NMS at the time C, less a number of the buffer of threads associated with the job category and the number of allocated threads associated with the job category of the NMS at the time C, to determine the number of available threads associated with the job category of the NMS at the time C.

Figure 1G:
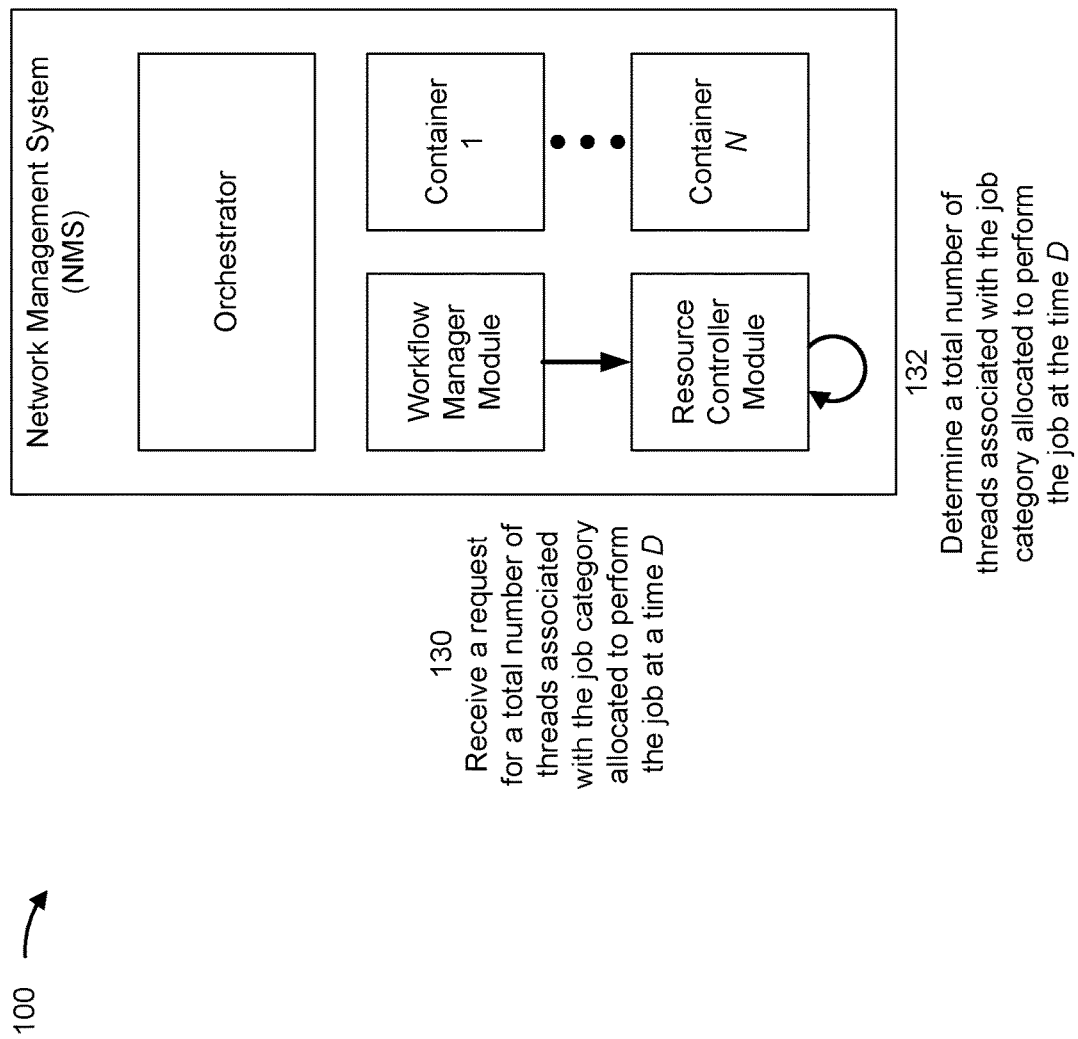

As shown in FIG. 1G, and by reference number 130, the resource controller module may receive a request for the total number of threads associated with the job category allocated to perform the job at a time D. For example, the workflow manager module may identify the job to be performed (e.g., after the resource controller module causes the first group of threads associated with the job category to be allocated to perform the job at the time A, as elsewhere described herein). In some implementations, the workflow manager module may identify that the job is a bulk operation job (e.g., that includes one or more tasks to be performed by each endpoint device of a set of the plurality of endpoint devices of the tenant) and may send the request for the total number of threads associated with the job category allocated to perform the job at the time D (e.g., to calculate an amount of time to complete performance of the job, as described elsewhere in). As shown by reference number 132, the resource controller module may determine, based on the first group of threads associated with the job category and/or the second group of threads associated with the job category, a total number of threads associated with the job category allocated to perform the job at the time D. For example, the resource controller module may identify a number of threads of the first group of threads associated with the job category to determine the total number of threads associated with the job category allocated to perform the job at the time D (e.g., when the time D is after time A and before time B and, accordingly, only the first group of threads associated with the job category have been allocated for the job). As an alternative example, the resource controller module may sum the number of threads of the first group of threads associated with the job category and a number of threads of the second group of threads associated with the job category to determine the total number of threads associated with the job category allocated to perform the job at the time D (e.g., when the time D is after time A and time B, and, accordingly, the first group of threads associated with the job category and the second group of threads associated with the job category have been allocated for the job).

Figure 1H:
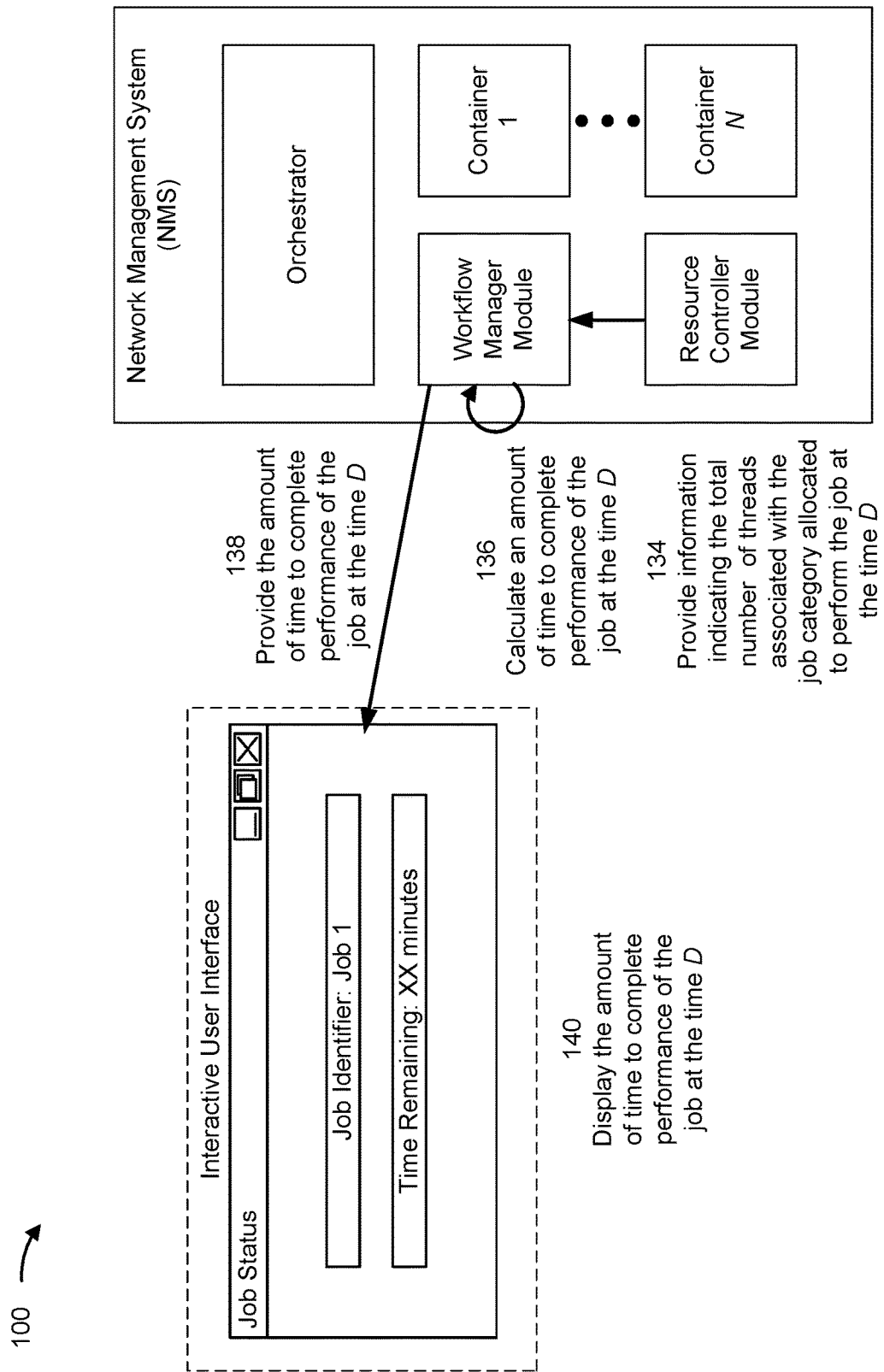

As shown in FIG. 1H, and by reference number 134, the resource controller module may provide information indicating the total number of threads associated with the job category allocated to perform the job at the time D (e.g., to the workflow manager module). In this way, the workflow manager module may receive the information. Accordingly, as shown by reference number 136, the workflow manager module may calculate, based on the information, an amount of time to complete performance of the job at the time D. For example, the workflow manager module may determine a total number of tasks to be performed to complete performance of the job and may determine a representative amount of time to perform a task of the total number of tasks. The workflow manager module may determine, based on the total number of tasks, the representative amount of time, and the information indicating the total number of threads associated with the job category allocated to perform the job at the time D, the amount of time to complete performance of the job at the time D.

As shown by reference number 138, the NMS (e.g., using the workflow manager module) may provide the amount of time to complete performance of the job at the time D (e.g., for display). For example, the NMS may provide the interactive user interface for display (e.g., as described elsewhere herein). The interactive user interface may include the amount of time to complete performance of the job at the time D. Accordingly, as shown by reference number 140, a device (e.g., an endpoint device, of the one or more endpoint devices, or another device, such as a client device associated with the NMS) may receive and display (e.g., on a display screen of the device) the amount of time to complete performance of the job at the time D.

As indicated above, FIGS. 1A-1H are provided merely as one or more examples. Other examples may differ from what is described with regard to FIGS. 1A-1H.

Figure 2:
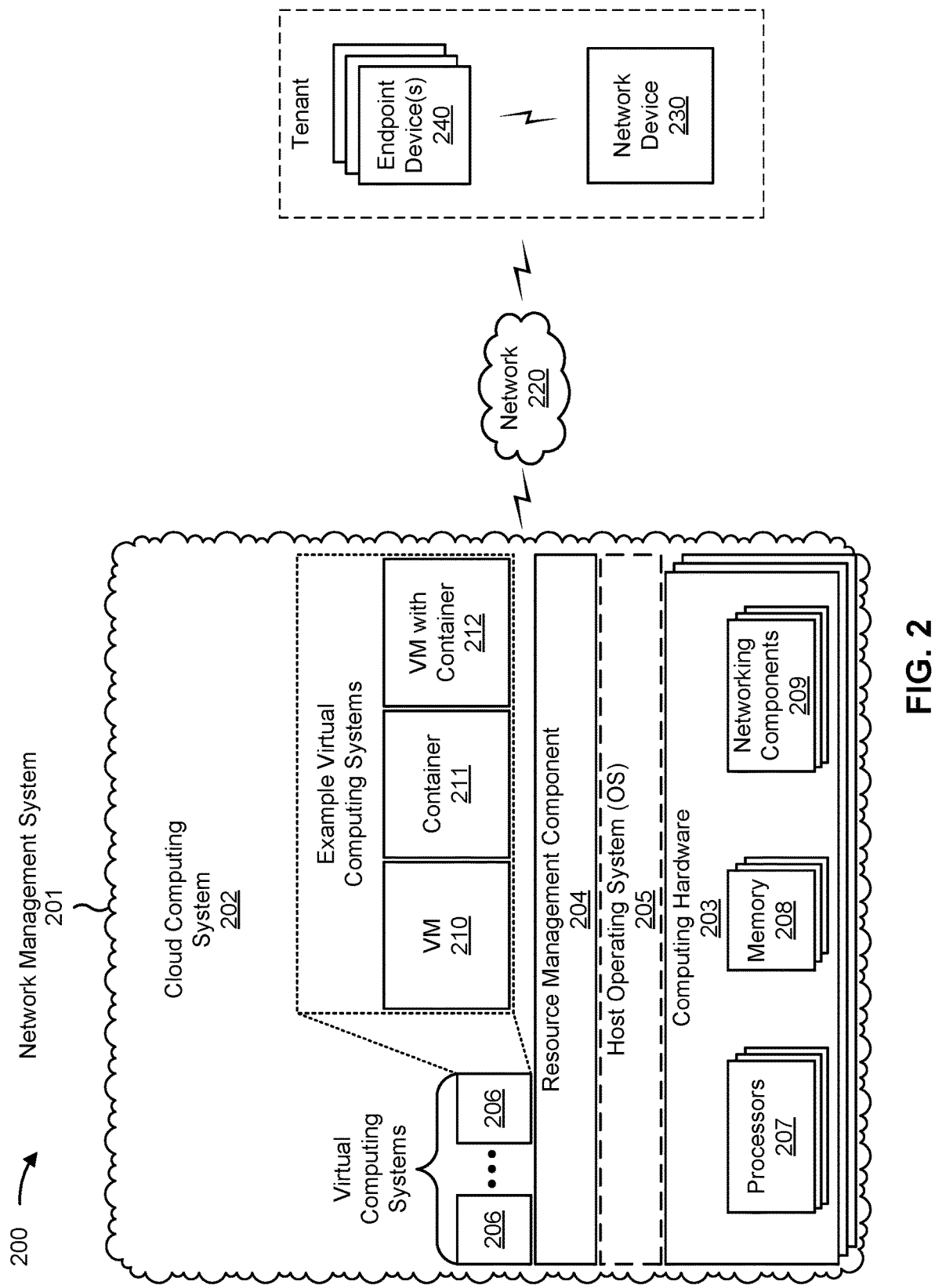
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network management system 201, which may include one or more elements of and/or may execute within a cloud computing system 202. The cloud computing system 202 may include one or more elements 203-212, as described in more detail below. As further shown in FIG. 2, environment 200 may include a network 220, a network device 230, and/or an endpoint device 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211 (e.g., that comprise one or more threads). In some implementations, the resource management component 204 executes within and/or in coordination with a host operating system 205. In some implementations, the resource management component 204 includes the orchestrator, the workflow manager module, and/or the resource controller module described herein in relation to FIGS. 1A-1H.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network management system 201 may include one or more elements 203-212 of the cloud computing system 202, may execute within the cloud computing system 202, and/or may be hosted within the cloud computing system 202, in some implementations, the network management system 201 may not be cloud-based (e.g., may be implemented outside of a cloud computing system) or may be partially cloud-based. For example, the network management system 201 may include one or more devices that are not part of the cloud computing system 202, such as device 300 of FIG. 3, which may include a standalone server or another type of computing device. The network management system 201 may perform one or more operations and/or processes described in more detail elsewhere herein. In some implementations, the network management system may provide a multi-tenant SaaS environment.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Network device 230 includes one or more devices capable of receiving, processing, storing, routing, and/or providing traffic (e.g., a packet or other information or metadata) in a manner described herein. For example, network device 230 may include a router, such as a label switching router (LSR), a label edge router (LER), an ingress router, an egress router, a provider router (e.g., a provider edge router or a provider core router), a virtual router, or another type of router. Additionally, or alternatively, network device 230 may include a gateway, a switch, a firewall, a hub, a bridge, a reverse proxy, a server (e.g., a proxy server, a cloud server, or a data center server), a load balancer, and/or a similar device. In some implementations, network device 230 may be a physical device implemented within a housing, such as a chassis. In some implementations, network device 230 may be a virtual device implemented by one or more computer devices of a cloud computing environment or a data center. In some implementations, a group of network devices 230 may be a group of data center nodes that are used to route traffic flow through network 220. In some implementations, network device 230 may associated with a tenant of the multi-tenant SaaS environment provided by the network management system 201.

Endpoint device 240 includes one or more devices capable of receiving, generating, storing, processing, and/or providing information, such as information described herein. For example, endpoint device 240 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 240 may receive network traffic from and/or may provide network traffic to network management system 201 and/or network device 230, via network 220. In some implementations, endpoint device 240 may associated with a tenant of the multi-tenant SaaS environment provided by the network management system 201.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
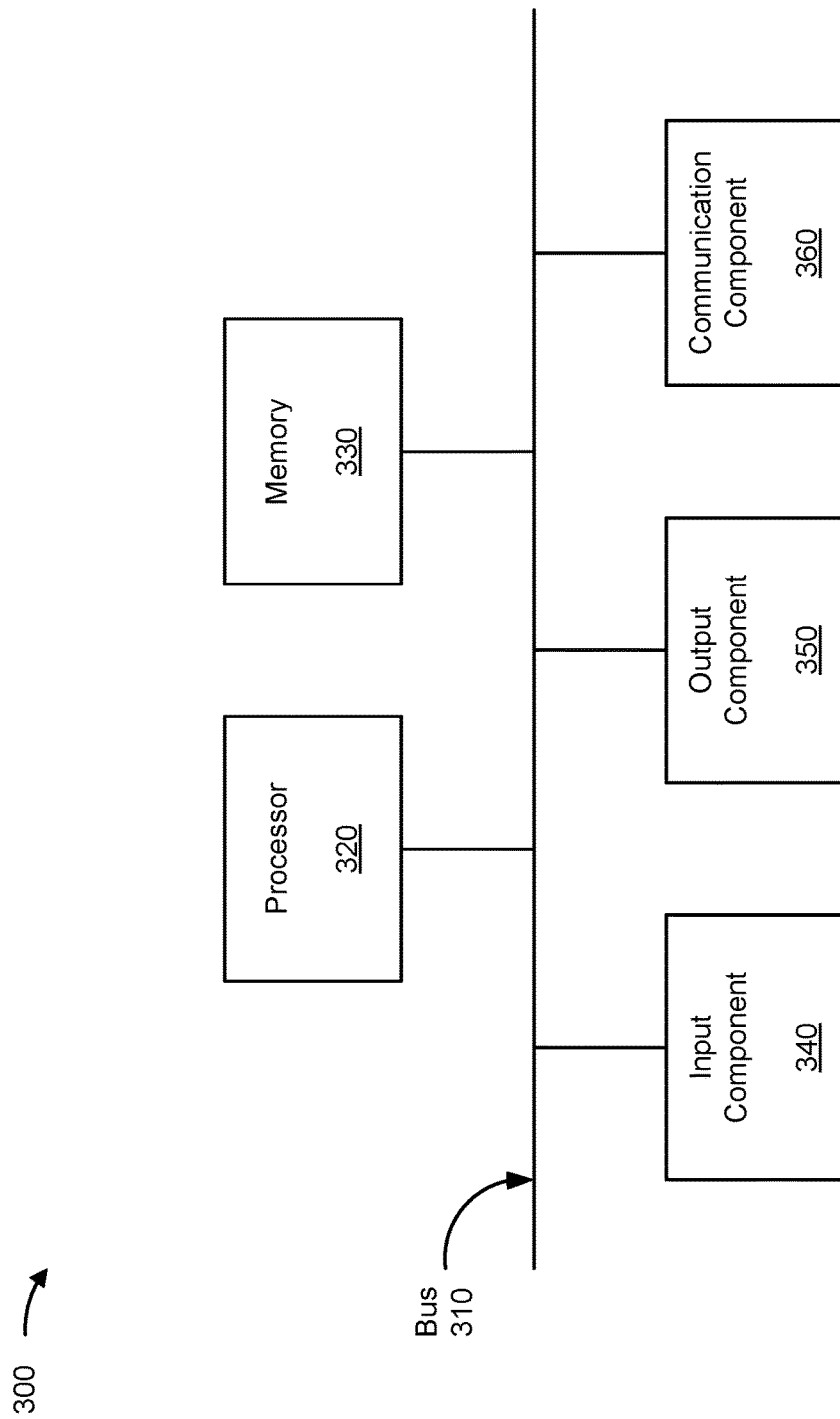
FIGS. 3-4 are diagrams of example components of one or more devices of FIG. 2.

FIG. 3 is a diagram of example components of a device 300, which may correspond to network management system 201, computing hardware 203, network device 230, and/or endpoint device 240. In some implementations, network management system 201, computing hardware 203, network device 230, and/or endpoint device 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium.

Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
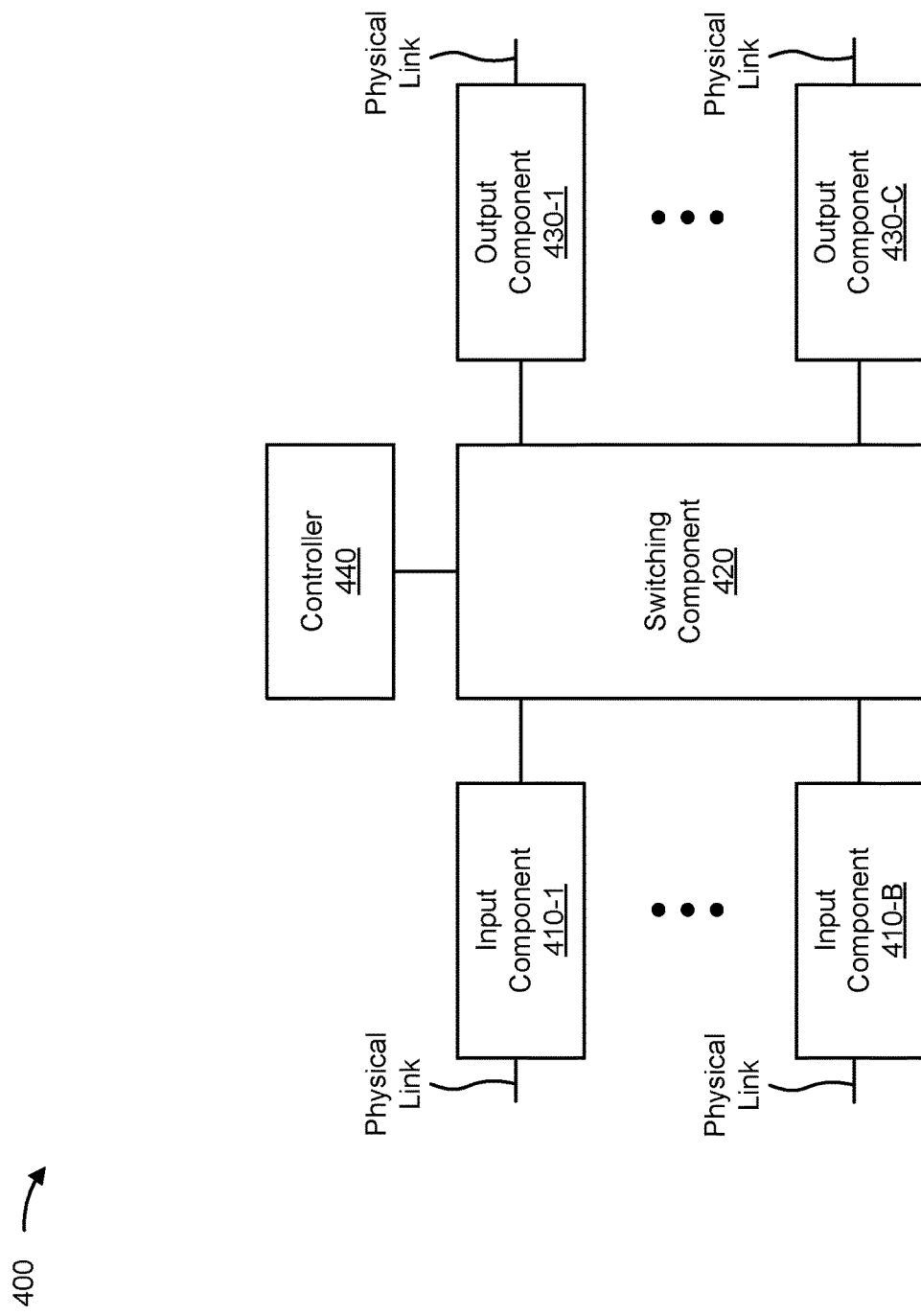

FIG. 4 is a diagram of example components of a device 400. Device 400 may correspond to network management system 201, computing hardware 203, network device 230, and/or endpoint device 240. In some implementations, network management system 201, computing hardware 203, network device 230, and/or endpoint device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
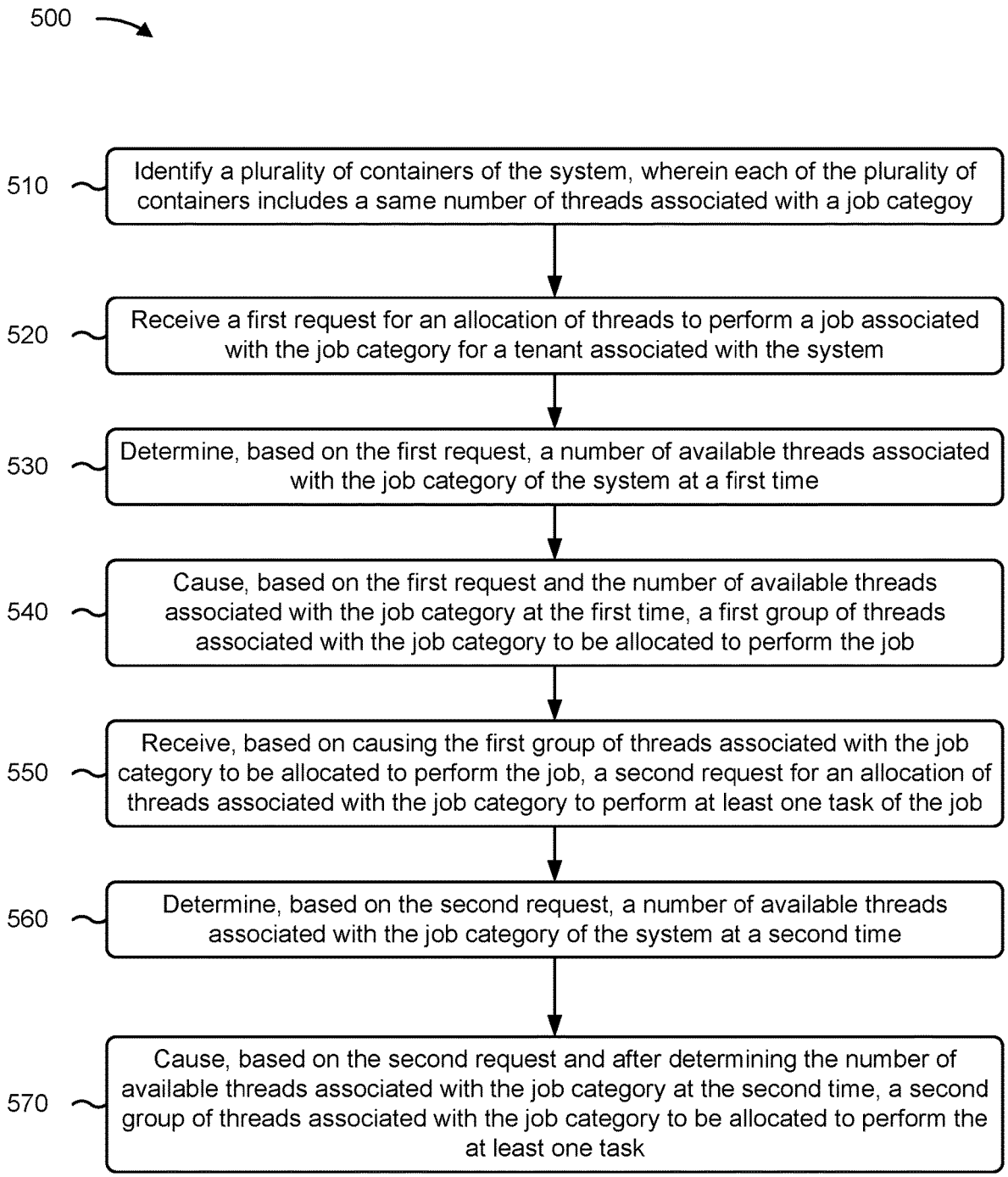
FIGS. 5-6 are flowcharts of example processes relating to a network management system for allocating threads for performance of a job for a tenant associated with the network management system.

FIG. 5 is a flowchart of an example process 500 associated with a network management system for allocating threads for performance of a job for a tenant associated with the network management system. In some implementations, one or more process blocks of FIG. 5 are performed by a system (e.g., network management system 201), and in some implementations, a particular module of the system (e.g., a resource controller module of network management system 201). In some implementations, one or more process blocks of FIG. 5 are performed by another device or a group of devices separate from or including the system, such as a network device (e.g., network device 230) and/or and endpoint device (e.g., endpoint device 240). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include identifying a plurality of containers of the system, wherein each of the plurality of containers includes a same number of threads associated with the job category (block 510). For example, the system may identify a plurality of containers of the system, wherein each of the plurality of containers includes a same number of threads, as described above. In some implementations, each of the plurality of containers includes a same number of threads associated with the job category.

As further shown in FIG. 5, process 500 may include receiving a first request for an allocation of threads to perform a job associated with the job category for a tenant associated with the system (block 520). For example, the system may receive a first request for an allocation of threads to perform a job associated with the job category for a tenant associated with the system, as described above.

As further shown in FIG. 5, process 500 may include determining, based on the first request, a number of available threads associated with the job category of the system at a first time (block 530). For example, the system may determine, based on the first request, a number of available threads associated with the job category of the system at a first time, as described above.

As further shown in FIG. 5, process 500 may include causing, based on the first request and the number of available threads associated with the job category at the first time, a first group of threads associated with the job category to be allocated to perform the job (block 540). For example, the system may cause, based on the first request and the number of available threads associated with the job category at the first time, a first group of threads associated with the job category to be allocated to perform the job, as described above.

As further shown in FIG. 5, process 500 may include receiving, based on causing the first group of threads associated with the job category, a second request for an allocation of threads associated with the job category to perform at least one task of the job (block 550). For example, the system may receive, based on causing the first group of threads associated with the job category to be allocated to perform the job, a second request for an allocation of threads associated with the job category to perform at least one task of the job, as described above.

As further shown in FIG. 5, process 500 may include determining, based on the second request, a number of available threads associated with the job category of the system at a second time (block 560). For example, the system may determine, based on the second request, a number of available threads associated with the job category of the system at a second time, as described above.

As further shown in FIG. 5, process 500 may include causing, based on the second request and after determining the number of available threads associated with the job category at the second time, a second group of threads associated with the job category to be allocated to perform the at least one task (block 570). For example, the system may cause, based on the second request and after determining the number of available threads associated with the job category at the second time, a second group of threads associated with the job category to be allocated to perform the at least one task, as described above.

Process 500 may include additional implementations, such as any single implementation or any combination of implementations described below and/or in connection with one or more other processes described elsewhere herein.

In a first implementation, the first request includes information indicating at least one of an identifier associated with the tenant, a job category of the job, a weight associated with the job, a minimum number of threads to perform the job, or a maximum number of threads to perform the job.

In a second implementation, alone or in combination with the first implementation, process 500 includes receiving a message indicating a container creation or container deletion event; determining, based on the message, a number of the plurality of containers at a third time; determining, based on determining the number of the plurality of containers at the third time, a number of overall threads associated with the job category of the system at the third time; and determining, based on the number of overall threads associated with the job category of the system at the third time, a number of available threads associated with the job category of the system at the third time.

In a third implementation, alone or in combination with one or more of the first and second implementations, determining the number of available threads associated with the job category of the system at the first time includes determining, based on the first request, a number of the plurality of containers at the first time; determining, based on determining the number of the plurality of containers at the first time, a number of overall threads associated with the job category of the system at the first time; communicating with a data structure to determine a number of allocated threads associated with the job category of the system at the first time; and determining, based on the number of overall threads associated with the job category of the system at the first time and the number of allocated threads associated with the job category of the system at the first time, the number of available threads associated with the job category of the system at the first time.

In a fourth implementation, alone or in combination with one or more of the first through third implementations, determining the number of available threads associated with the job category of the system at the second time includes determining, based on the second request, a number of the plurality of containers at the second time; determining, based on determining the number of the plurality of containers at the second time, a number of overall threads associated with the job category of the system at the second time; communicating with the data structure to determine a number of allocated threads associated with the job category of the system at the second time; and determining, based on the number of overall threads associated with the job category of the system at the second time and the number of allocated threads associated with the job category of the system at the second time, the number of available threads associated with the job category of the system at the second time.

In a fifth implementation, alone or in combination with one or more of the first through fourth implementations, causing the first group of threads associated with the job category to be allocated to perform the job includes processing the first request to determine a minimum number of threads associated with the job category to perform the job; determining that the minimum number of threads associated with the job category to perform the job is greater than or equal to the number of available threads associated with the job category of the system at the first time; causing, based on determining that the minimum number of threads associated with the job category to perform the job is greater than or equal to the number of available threads associated with the job category of the system at the first time, additional containers to be created and to be added to the plurality of containers of the system; and causing, based on causing the additional containers to be created and to be added to the plurality of containers of the system, the first group of threads associated with the job category to be allocated to perform the job, wherein the first group of threads associated with the job category includes a total number of threads associated with the job category that is greater than or equal to the minimum number of threads associated with the job category to perform the job.

In a sixth implementation, alone or in combination with one or more of the first through fifth implementations, causing the first group of threads associated with the job category to be allocated to perform the job includes processing the first request to determine a minimum number of threads associated with the job category to perform the job and a maximum number of threads associated with the job category to perform the job; determining that the minimum number of threads associated with the job category to perform the job is less than the number of available threads associated with the job category of the system at the first time; and causing, based on determining that the minimum number of threads associated with the job category to perform the job is less than the number of available threads associated with the job category of the system at the first time, a particular group of threads associated with the job category to be allocated to perform the job, wherein the particular group of threads associated with the job category includes a total number of threads associated with the job category that is greater than or equal to the minimum number of threads associated with the job category to perform the job and less than or equal to the maximum number of threads associated with the job category to perform the job.

In a seventh implementation, alone or in combination with one or more of the first through sixth implementations, causing the group of threads associated with the job category to be allocated to perform the at least one task includes processing the second request to determine a minimum number of threads associated with the job category to perform the at least one task and a maximum number of threads associated with the job category to perform the at least one task; determining that the maximum number of threads associated with the job category to perform the at least one task is less than the number of available threads associated with the job category of the system at the second time; and causing, based on determining that the maximum number of threads associated with the job category to perform the at least one task is less than the number of available threads associated with the job category of the system at the second time, a particular group of threads associated with the job category to be allocated to perform the at least one task, wherein the particular group of threads associated with the job category includes a total number of threads associated with the job category that is greater than or equal to the minimum number of threads associated with the job category to perform the job and less than or equal to the maximum number of threads associated with the job category to perform the job.

In an eighth implementation, alone or in combination with one or more of the first through seventh implementations, process 500 includes receiving a third request for a total number of threads associated with the job category allocated to perform the job at a third time; determining, based on the first group of threads associated with the job category, a total number of threads associated with the job category allocated to perform the job at the third time; and providing information indicating the total number of threads associated with the job category allocated to perform the job at the third time, wherein providing the information is to cause calculation of an amount of time to complete performance of the job at the third time, and display of the amount of time to complete performance of the job at the third time.

In a ninth implementation, alone or in combination with one or more of the first through eighth implementations, process 500 includes receiving a fourth request for the total number of threads associated with the job category allocated to perform the job at a fourth time; determining, based on the first group of threads associated with the job category and the second group of threads associated with the job category, a total number of threads associated with the job category allocated to perform the job at the fourth time; and providing additional information indicating the total number of threads associated with the job category allocated to perform the job at the fourth time, wherein providing the additional information is to cause calculation of an amount of time to complete performance of the job at the fourth time, and display of the amount of time to complete performance of the job at the fourth time.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
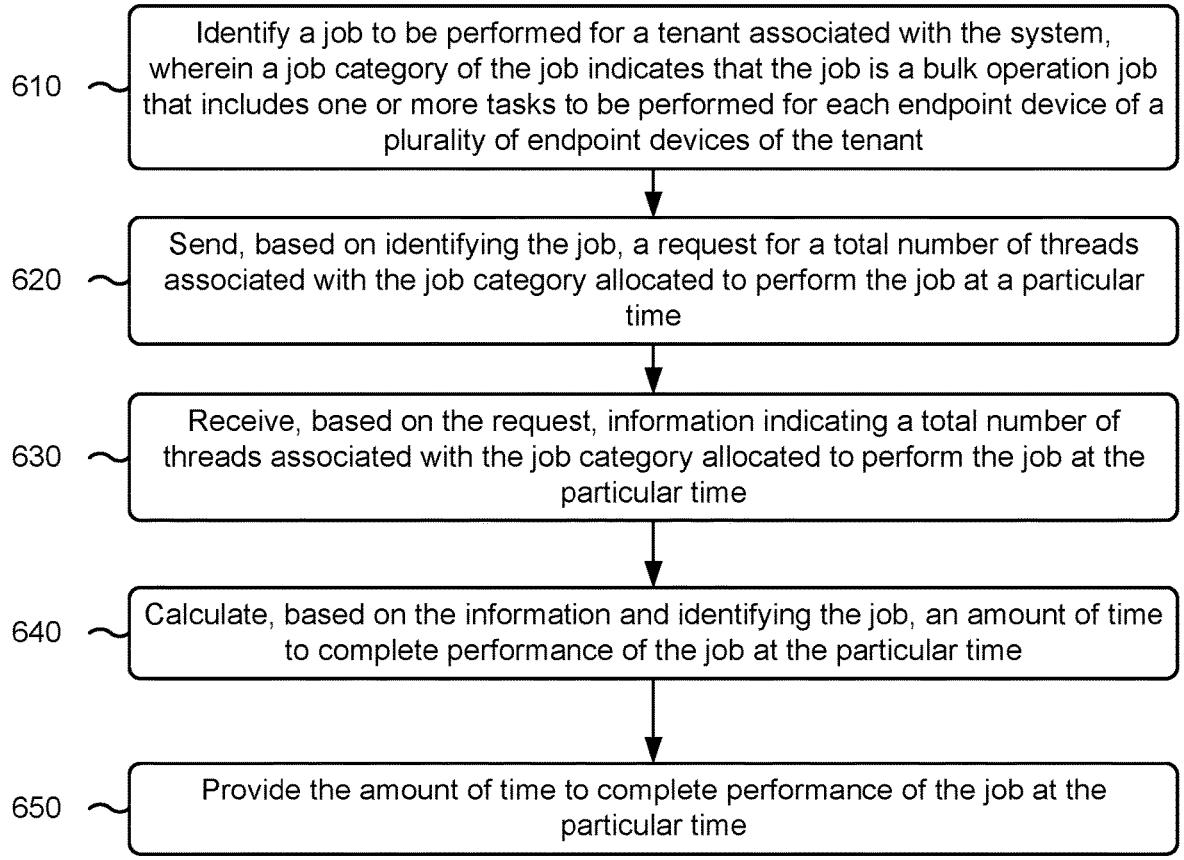

FIG. 6 is a flowchart of an example process 600 associated with a network management system for allocating threads for performance of a job for a tenant associated with the network management system. In some implementations, one or more process blocks of FIG. 6 are performed by a system (e.g., network management system 201), and in some implementations, a particular module of the system (e.g., a workflow manager module of network management system 201). In some implementations, one or more process blocks of FIG. 6 are performed by another device or a group of devices separate from or including the system, such as a network device (e.g., network device 230) and/or and endpoint device (e.g., endpoint device 240). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 6, process 600 may include identifying a job to be performed for a tenant associated with the system, wherein a job category associated with the job indicates that the job is a bulk operation job that includes one or more tasks to be performed for each endpoint device of a plurality of endpoint devices of the tenant (block 610). For example, the system may identify a job to be performed for a tenant associated with the system, as described above. In some implementations, a job category associated with the job indicates that the job is a bulk operation job that includes one or more tasks to be performed for each endpoint device of a plurality of endpoint devices of the tenant.

As further shown in FIG. 6, process 600 may include sending, based on identifying the job, a request for a total number of threads associated with the job category allocated to perform the job at a particular time (block 620). For example, the system may send, based on identifying the job, a request for a total number of threads associated with the job category allocated to perform the job at a particular time, as described above.

As further shown in FIG. 6, process 600 may include receiving, based on the request, information indicating a total number of threads associated with the job category allocated to perform the job at the particular time (block 630). For example, the system may receive, based on the request, information indicating a total number of threads associated with the job category allocated to perform the job at the particular time, as described above.

As further shown in FIG. 6, process 600 may include calculating, based on the information and identifying the job, an amount of time to complete performance of the job at the particular time (block 640). For example, the system may calculate, based on the information and identifying the job, an amount of time to complete performance of the job at the particular time, as described above.

As further shown in FIG. 6, process 600 may include providing the amount of time to complete performance of the job at the particular time (block 650). For example, the system may provide the amount of time to complete performance of the job at the particular time, as described above.

Process 600 may include additional implementations, such as any single implementation or any combination of implementations described below and/or in connection with one or more other processes described elsewhere herein.

In a first implementation, providing the amount of time to complete performance of the job at the particular time is to cause display of the amount of time to complete performance of the job at the particular time.

In a second implementation, alone or in combination with the first implementation, calculating the amount of time to complete performance of the job at the particular time includes determining, based on identifying the job, a total number of tasks to be performed to complete performance of the job; determining a representative amount of time to perform a task of the total number of tasks; and determining, based on the total number of tasks, the representative amount of time, and the information indicating the total number of threads associated with the job category allocated to perform the job at the particular time, the amount of time to complete performance of the job at the particular time.

In a third implementation, alone or in combination with one or more of the first and second implementations, process 600 includes sending, based on identifying the job, another request for a total number of threads associated with the job category allocated to perform the job at another particular time; receiving, based on the request, additional information indicating a total number of threads associated with the job category allocated to perform the job at the other particular time; calculating, based on the additional information, an amount of time to complete performance of the job at the other particular time; and transmitting, to the network device, the amount of time to complete performance of the job at the other particular time.

In a fourth implementation, alone or in combination with one or more of the first through third implementations, calculating the amount of time to complete performance of the job at the other particular time includes determining a total number of remaining tasks to be performed to complete performance of the job; determining a representative amount of time to perform a task of the total number of remaining tasks; and determining, based on the total number of remaining tasks, the representative amount of time, and the additional information indicating the total number of threads associated with the job category allocated to perform the job at the other particular time, the amount of time to complete performance of the job at the other particular time.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
   one or more memories; and
   one or more processors to:
   identify a plurality of containers of the system,
      wherein each of the plurality of containers includes a same number of threads associated with a job category;
   receive a first request for an allocation of threads to perform a job associated with the job category for a tenant associated with the system;
   determine, based on the first request, a number of available threads associated with the job category of the system at a first time;
   cause, based on the first request and the number of available threads associated with the job category at the first time, a first group of threads associated with the job category to be allocated to perform the job;
   receive, based on causing the first group of threads associated with the job category to be allocated to perform the job, a second request for an allocation of threads associated with the job category to perform at least one task of the job;
   determine, based on the second request, a number of available threads associated with the job category of the system at a second time;
   cause, based on the second request and after determining the number of available threads associated with the job category at the second time, a second group of threads associated with the job category to be allocated to perform the at least one task;

receive a message indicating a container creation or container deletion event;

determine, based on the message, a number of the plurality of containers at a third time;

determine, based on determining the number of the plurality of containers at the third time, a number of overall threads associated with the job category of the system at the third time; and determine, based on the number of overall threads associated with the job category of the system at the third time, a number of available threads associated with the job category of the system at the third time.

2. The system of claim 1, wherein the first request includes information indicating at least one of:

an identifier associated with the tenant;

a job category of the job;

a weight associated with the job;

a minimum number of threads to perform the job; or a maximum number of threads to perform the job.

3. The system of claim 1, wherein the one or more processors, to determine the number of available threads associated with the job category of the system at the first time, are to:

determine, based on the first request, a number of the plurality of containers at the first time;

determine, based on determining the number of the plurality of containers at the first time, a number of overall threads associated with the job category of the system at the first time;

communicate with a data structure to determine a number of allocated threads associated with the job category of the system at the first time; and determine, based on the number of overall threads associated with the job category of the system at the first time and the number of allocated threads associated with the job category of the system at the first time, the number of available threads associated with the job category of the system at the first time.

4. The system of claim 3, wherein the one or more processors, to determine the number of available threads associated with the job category of the system at the second time, are to:

determine, based on the second request, a number of the plurality of containers at the second time;

determine, based on determining the number of the plurality of containers at the second time, a number of overall threads associated with the job category of the system at the second time;

communicate with the data structure to determine a number of allocated threads associated with the job category of the system at the second time; and determine, based on the number of overall threads associated with the job category of the system at the second time and the number of allocated threads associated with the job category of the system at the second time, the number of available threads associated with the job category of the system at the second time.

5. The system of claim 1, wherein the one or more processors, to cause the first group of threads associated with the job category to be allocated to perform the job, are to:

process the first request to determine a minimum number of threads associated with the job category to perform the job;

determine that the minimum number of threads associated with the job category to perform the job is greater than or equal to the number of available threads associated with the job category of the system at the first time;

cause, based on determining that the minimum number of threads associated with the job category to perform the job is greater than or equal to the number of available threads associated with the job category of the system at the first time, additional containers to be created and to be added to the plurality of containers of the system; and cause, based on causing the additional containers to be created and to be added to the plurality of containers of the system, the first group of threads associated with the job category, to be allocated to perform the job, wherein the first group of threads associated with the job category includes a total number of threads associated with the job category that is greater than or equal to the minimum number of threads associated with the job category to perform the job.

6. The system of claim 1, wherein the one or more processors, to cause the first group of threads associated with the job category to be allocated to perform the job, are to:

process the first request to determine a minimum number of threads associated with the job category to perform the job and a maximum number of threads associated with the job category to perform the job;

determine that the minimum number of threads associated with the job category to perform the job is less than the number of available threads associated with the job category of the system at the first time; and cause, based on determining that the minimum number of threads associated with the job category to perform the job is less than the number of available threads associated with the job category of the system at the first time, a particular group of threads associated with the job category to be allocated to perform the job, wherein the particular group of threads associated with the job category includes a total number of threads associated with the job category that is greater than or equal to the minimum number of threads associated with the job category to perform the job and less than or equal to the maximum number of threads associated with the job category to perform the job.

7. The system of claim 1, wherein the one or more processors, to cause the group of threads associated with the job category to be allocated to perform the at least one task, are to:

process the second request to determine a minimum number of threads associated with the job category to perform the at least one task and a maximum number of threads associated with the job category to perform the at least one task;

determine that the maximum number of threads associated with the job category to perform the at least one task is less than the number of available threads associated with the job category of the system at the second time; and cause, based on determining that the maximum number of threads associated with the job category to perform the at least one task is less than the number of available threads associated with the job category of the system at the second time, a group of threads associated with the job category to be allocated to perform the at least one task, wherein the group of threads associated with the job category includes a total number of threads associated with the job category that is greater than or equal to the minimum number of threads associated with the job category to perform the job and less than or equal to the maximum number of threads associated with the job category to perform the job.

8. The system of claim 1, wherein the one or more processors are further to:
receive a third request for a total number of threads associated with the job category allocated to perform the job at a fourth time;
determine, based on the first group of threads associated with the job category, a total number of threads associated with the job category allocated to perform the job at the fourth time; and
provide information indicating the total number of threads associated with the job category allocated to perform the job at the fourth time,
wherein providing the information is to cause calculation of an amount of time to complete performance of the job at the fourth time, and display of the amount of time to complete performance of the job at the third fourth time.

9. The system of claim 8, wherein the one or more processors are further to:
receive a fourth request for the total number of threads associated with the job category allocated to perform the job at a fourth time;
determine, based on the first group of threads associated with the job category and the second group of threads associated with the job category, a total number of threads associated with the job category allocated to perform the job at the fourth time; and
provide additional information indicating the total number of threads associated with the job category allocated to perform the job at the fourth time,
wherein providing the additional information is to cause calculation of an amount of time to complete performance of the job at the fourth time, and display of the amount of time to complete performance of the job at the fourth time.

10. A method, comprising:
receiving, by a module of a system, a request for an allocation of threads to perform a job associated with a job category for a tenant associated with the system;
determining, by the module of the system and based on the request, a number of available threads associated with the job category of the system at a particular time; and
causing, by the module of the system and based on the request and the number of available threads associated with the job category at the particular time, a group of threads associated with the job category to be allocated to perform the job,
wherein the group of threads associated with the job category includes a total number of threads associated with the job category that is greater than or equal to a minimum number of threads associated with the job category to perform the job indicated by the request and less than or equal to a maximum number of threads associated with the job category to perform the job indicated by the request.

11. The method of claim 10, further comprising:
receiving an additional request for an allocation of threads associated with the job category to perform at least one task of the job;
determining, based on the additional request, a number of available threads associated with the job category of the system at another particular time; and
causing, based on the additional request and after determining the number of available threads associated with the job category at the other particular time, another group of threads associated with the job category to be allocated to perform the at least one task.

12. The method of claim 10, wherein determining the number of available threads associated with the job category of the system at the particular time comprises:
determining, based on the request, a number of overall threads associated with the job category of the system at the particular time and a number of allocated threads associated with the job category of the system at the particular time; and
determining, based on the number of overall threads associated with the job category of the system at the particular time and the number of allocated threads associated with the job category of the system at the particular time, the number of available threads associated with the job category of the system at the particular time.

13. The method of claim 10, further comprising:
receiving, from another module of the system, an additional request for a total number of threads associated with the job category allocated to perform the job at another particular time;
determining, based on the group of threads associated with the job category, a total number of threads associated with the job category allocated to perform the job at the other particular time; and
providing, to the other module of the system, information indicating the total number of threads associated with the job category allocated to perform the job at the other particular time,
wherein providing the information is to cause the other module of the system to:
calculate an amount of time to complete performance of the job at the other particular time; and
display of the amount of time to complete performance of the job at the other particular time.

14. The system of claim 1, wherein the one or more processors are further to:
receive a third request for a total number of threads associated with the job category allocated to perform the job at a fourth time;
determine a total number of threads associated with the job category allocated to perform the job at the fourth time; and
provide information indicating an amount of time to complete performance of the job at the fourth time,
wherein the amount of time is calculated based on determining the total number of threads.

15. The system of claim 1, wherein the plurality of containers are associated with a network management system.

16. The method of claim 10, wherein each of a plurality of containers of the system includes a set of threads.

17. The method of claim 10, further comprising:
receiving another request requesting a total number of threads associated with the job category allocated to perform the job at another particular time; and
providing information indicating an amount of time in completing the job at the other particular time,
wherein the amount of time is calculated based on determining the total number of threads.

18. The method of claim 17, further comprising:
causing additional containers to be created.

19. A non-transitory computer-readable medium storing a set of instructions, the set of instructions comprising:

one or more instructions that, when executed by one or more processors of a device, cause the device to:
- receive a request for an allocation of threads to perform a job associated with a job category for a tenant associated with a system that includes the device;
- determine, based on the request, a number of available threads associated with the job category of the system at a particular time; and
- cause, based on the request and the number of available threads associated with the job category at the particular time, a group of threads associated with the job category to be allocated to perform the job,
    - wherein the group of threads associated with the job category includes a total number of threads associated with the job category that is greater than or equal to a minimum number of threads associated with the job category to perform the job indicated by the request and less than or equal to a maximum number of threads associated with the job category to perform the job indicated by the request.

20. The non-transitory computer-readable medium of claim 19, wherein the one or more instructions further cause the device to:
- receive an additional request for an allocation of threads associated with the job category to perform at least one task of the job;
- determine, based on the additional request, a number of available threads associated with the job category of the system at another particular time; and
- cause, based on the additional request and after determining the number of available threads associated with the job category at the other particular time, another group of threads associated with the job category to be allocated to perform the at least one task.

* * * * *